US011550674B2

(12) United States Patent
Govindarajan et al.

(10) Patent No.: US 11,550,674 B2
(45) Date of Patent: Jan. 10, 2023

(54) REDUNDANT COMMUNICATIONS FOR MULTI-CHIP SYSTEMS

(71) Applicant: Texas Instruments Incorporated, Dallas, TX (US)

(72) Inventors: Sriramakrishnan Govindarajan, Bengaluru (IN); Mihir Narendra Mody, Bengaluru (IN); Prithvi Shankar Yeyyadi Anantha, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/463,232

(22) Filed: Aug. 31, 2021

(65) Prior Publication Data
US 2022/0138058 A1 May 5, 2022

(30) Foreign Application Priority Data
Oct. 29, 2020 (IN) .............................. 202041047260

(51) Int. Cl.
 *G06F 11/14* (2006.01)
(52) U.S. Cl.
 CPC ...... *G06F 11/1497* (2013.01); *G06F 2201/87* (2013.01)
(58) Field of Classification Search
 CPC .................. G06F 11/1497; G06F 2201/87
 See application file for complete search history.

(56) References Cited

U.S. PATENT DOCUMENTS

| 7,636,835 | B1 | 12/2009 | Ramey et al. |
| 2002/0087880 | A1 | 4/2002 | Rhoades |
| 2010/0158005 | A1 | 6/2010 | Mukhopadhyay et al. |
| 2013/0195210 | A1 | 1/2013 | Swarbrick et al. |
| 2015/0081986 | A1* | 3/2015 | Chin ........................ G06F 9/467 711/154 |
| 2020/0293465 | A1* | 9/2020 | Yang ........................ H04L 49/70 |

OTHER PUBLICATIONS

International Search Report for PCT/US2021/056935 dated Feb. 3, 2022.

* cited by examiner

*Primary Examiner* — Joseph R Kudirka
(74) *Attorney, Agent, or Firm* — Brian D. Graham; Frank D. Cimino (57) ABSTRACT

An electronic device, comprising: a first component configured to transmit a first set of data to a second component by providing a first memory request specifying the first set of data for and an input memory address, and a transaction tracking unit coupled to a first transport interface, the transaction tracking unit configured to: receive the first memory request; transmit a second memory request that specifies at least a first portion of the first set of data, via the first transport interface, to the second component; receive a response to the second memory request from the second component; determine that the response corresponds to the second memory request; and provide, to the first component, an output response based on the received response to the second memory request.

20 Claims, 7 Drawing Sheets

| SUB-REGION 1 | ADDRESS BASE | SUB-REGION 1 SIZE | MODE | MODE PARAMETERS |
|---|---|---|---|---|
| SUB-REGION 2 | ADDRESS BASE | SUB-REGION 2 SIZE | MODE | MODE PARAMETERS |
| ∘ ∘ ∘ | ∘ ∘ ∘ | ∘ ∘ ∘ | ∘ ∘ ∘ | ∘ ∘ ∘ |
| SUB-REGION M | ADDRESS BASE | SUB-REGION N SIZE | MODE | MODE PARAMETERS |

REDUNDANT COMMUNICATIONS FOR MULTI-CHIP SYSTEMS

CROSS-REFERENCE TO RELATED APPLICATIONS

This application claims priority to India Provisional Application No. 202041047260, filed Oct. 29, 2020 which is hereby incorporated by reference.

BACKGROUND

Machine learning (ML) is becoming an increasingly important part of the computing landscape. Machine learning is a type of artificial intelligence (AI) and ML helps enable a software system to learn to recognize patterns from data without being directly programmed to do so. Neural networks (NN) area type of ML which utilize a set of linked and layered functions (e.g., node, neuron, etc.) which are weighted to evaluate input data. In some NNs, sometimes referred to as convolution neural networks (CNNs), convolution operations may be performed in NN layers based on inputs received and weights CNNs are often used in a wide array of applications typically for recognition and classification, such as image recognition and classification, prediction and recommendation systems, speech and language recognition and translation, etc.

As ML become increasingly useful, there is a desire to execute multiple complex ML techniques, such as NNs and CNNs, efficiently in devices with a high degree of availability. For example, for a partially or fully automated driving application, multiple ML models may be executed concurrently and in real-time to identify, recognize, and/or predict objects, paths, trajectories, etc. These ML models may need to be available for use, even if there are issues that could impact the performance of the ML models, such as partial hardware failure, performance degradations for example due to a large number of inputs, inclement weather conditions, etc.

SUMMARY

This disclosure relates to an electronic device, comprising: a local component configured to transmit a first set of data to a second component by providing a first memory request specifying the first set of data for and an input memory address, and a transaction tracking unit coupled to a first transport interface, the transaction tracking unit configured to: receive the first memory request; transmit a second memory request that specifies at least a first portion of the first set of data, via the first transport interface, to the second component; receive a response to the second memory request from the second component; determine that the response corresponds to the second memory request; and provide, to the first component, an output response based on the received response to the second memory request.

Another aspect of the present disclosure relates to a circuit comprising: a transaction tracking unit configured to: receive a first message from a remote component via a first transport interface; and a memory mapped port coupled to the tracking unit, the memory mapped port configured to: output the first message to a local component; receive a response from the local component; wherein the tracking unit is further configured to: determine that the received response corresponds to the first message from the remote component; and output at least a first portion of the response to the remote component via the first transport interface.

Another aspect of the present disclosure relates to method for transmitting data, the method comprising: receiving, from a first component, first data associated with a mapped input memory address to transmit to a second component; transmitting at least a first portion of the first data, via a first transport interface, to the second component; recording a status of the transmission to the second component; receiving a response to the transmission from the second component; determining that the response corresponds to the recorded transmission; and providing the response to the first component.

BRIEF DESCRIPTION OF THE DRAWINGS

For a detailed description of various examples, reference will now be made to the accompanying drawings in which.

DETAILED DESCRIPTION

Increasingly, software, including ML techniques, are being used in systems where a high degree of availability is desired, such as safety or mission critical systems. Additionally, the software used in such systems is becoming increasingly complex and may represent an increased computing workload. Often, such systems may be scaled to handle increased workloads by parallelizing systems, such as by having multiple compute cores, such as multiple central processing unit (CPU) cores, higher and lower powered CPU cores, ML cores, graphics processing unit (GPU) cores, as well as increased memory, communication links, etc., allowing multiple software modules to run in parallel. Having multiple cores helps performance scaling and provides a level of redundancy. For example, multiple cores help provide redundancy in case one or more CPUs fail. As another example, multiple cores may also help increase performance of chained software, where an output of one software module may be input to another module running in parallel. In some cases, a redundant communications path may be provided to help increase redundancy and availability.

Figure 1:
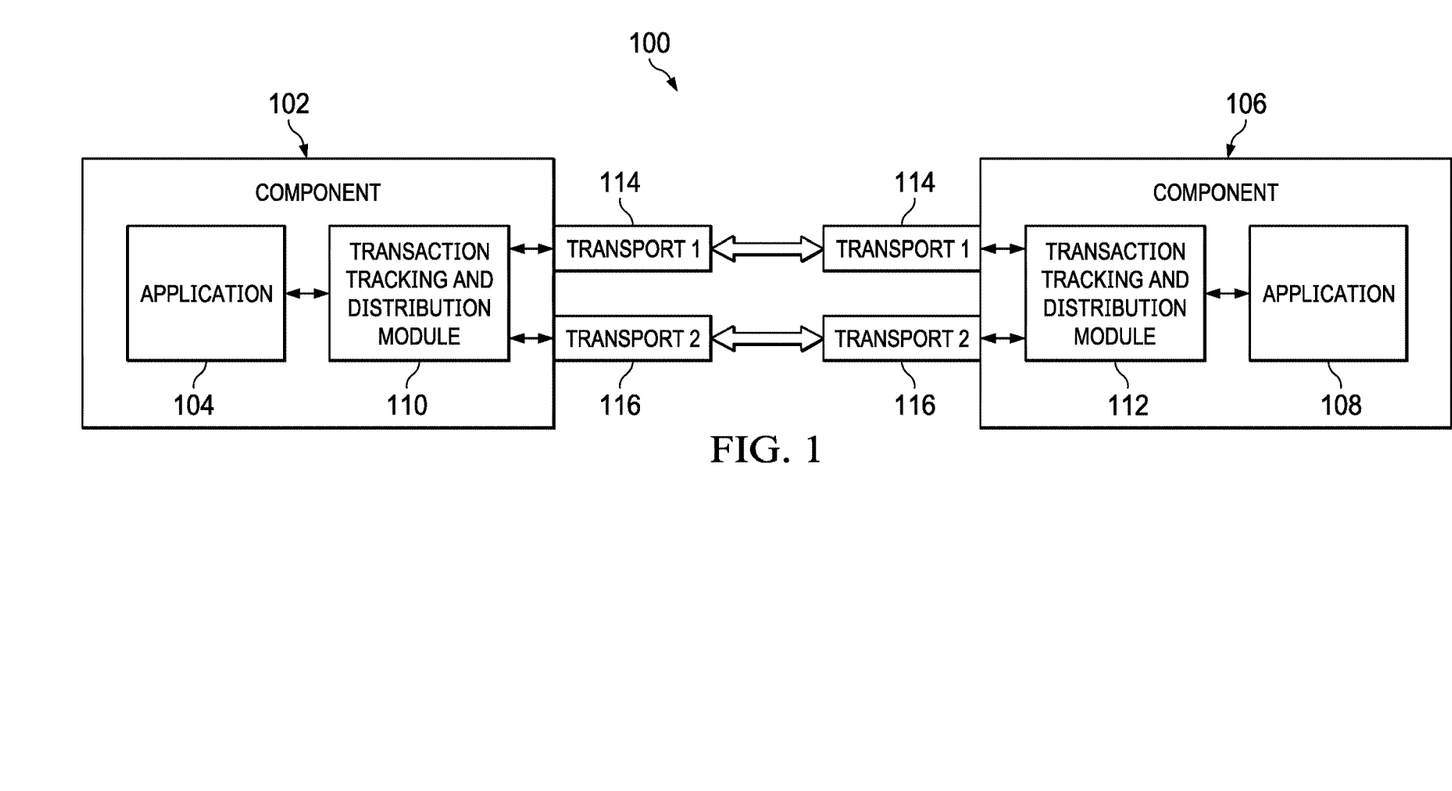
FIG. 1 is a block diagram of processing systems coupled via redundant communications paths, in accordance with aspects of the present disclosure.

FIG. 1 is a block diagram 100 of components coupled via redundant communications paths, in accordance with aspects of the present disclosure. As used herein, components include electronic devices which may access another component via a transport interface. As an example, components that may access other components may include processors, processor packages, controllers, direct memory access/input output devices, etc. Components which may be accessed may include other processors, processor packages, and/or controllers and may also include I/O devices, network devices, memory such as double data rate random access memory and/or other types of random-access memory, etc. As shown, block diagram 100 includes a first component 102, such as a processor core, which may be executing a first application 104, such as a ML model or other software. In some cases, there may be a desire to transmit data to a second component 106, such as another processor core, for example for a second application 108, which may be any software executing on the second component 106, including another instance of the first application 104. This first application 104 may transmit information to the second application 108 via a first transaction tracking and distribution module (TTDM) 110. The TTDM 110 may accept information via a proxy memory window presented as a mapped memory region to which an application or other process may read, write, and/or otherwise provide a memory request to. The first application 104 may pass information to the TTDM 110 by initiating a transaction, such as a read or write request, to the mapped memory region managed by the TTDM 110.

The mapped memory region of the TTDM may provide access to transport interfaces via the TTDM. These mapped memory regions may correspond to memory (e.g., cache memory, registers, DRAM (dynamic random-access memory), etc.) of the first TTDM 110, rather than local memory. The mapped memory region may be configurable in size and may include multiple regions rather than a single continuous region. In some cases, one or more portions of the mapped memory region may be reserved for transmitting data to other components via the first TTDM 110 and another one or more portions may be reserved for receiving data from other components via the first TTDM 110. In some cases, one or more portions of the mapped memory region may be reserved for instructions to the first TTDM 110 and another one or more portions may be reserved for data to be transmitted to the other component. Using a mapped memory region to transmit and/or receive data with another component helps abstract the transport protocol from the application and helps allow the application to function with a variety of transport technology.

After the first TTDM 110 receives the information, the first TTDM 110 then transmits one or more portions of the information to a second TTDM 112 of the second component 106 via one or more transport technologies. Transport technologies provide a data path between components. Examples of transport technologies include bus architectures, such as peripheral component interconnect (PCI) bus, ethernet, HyperLink transport, etc. The first TTDM 110 is coupled to multiple transport technologies, here a first transport technology 114 and a second transport technology 116. Multiple transport technologies may help provide redundancy for communications paths. The first TTDM 110 may determine whether to transmit messages from the first application 104 to the second TTDM 112 and the second application 108 via one of, or both of, the transport technologies 114 and/or 116. For example, the first TTDM 110 may replicate the message and transmit the message on both the first transport technology 114 and the second transport technology 116.

Figure 2:
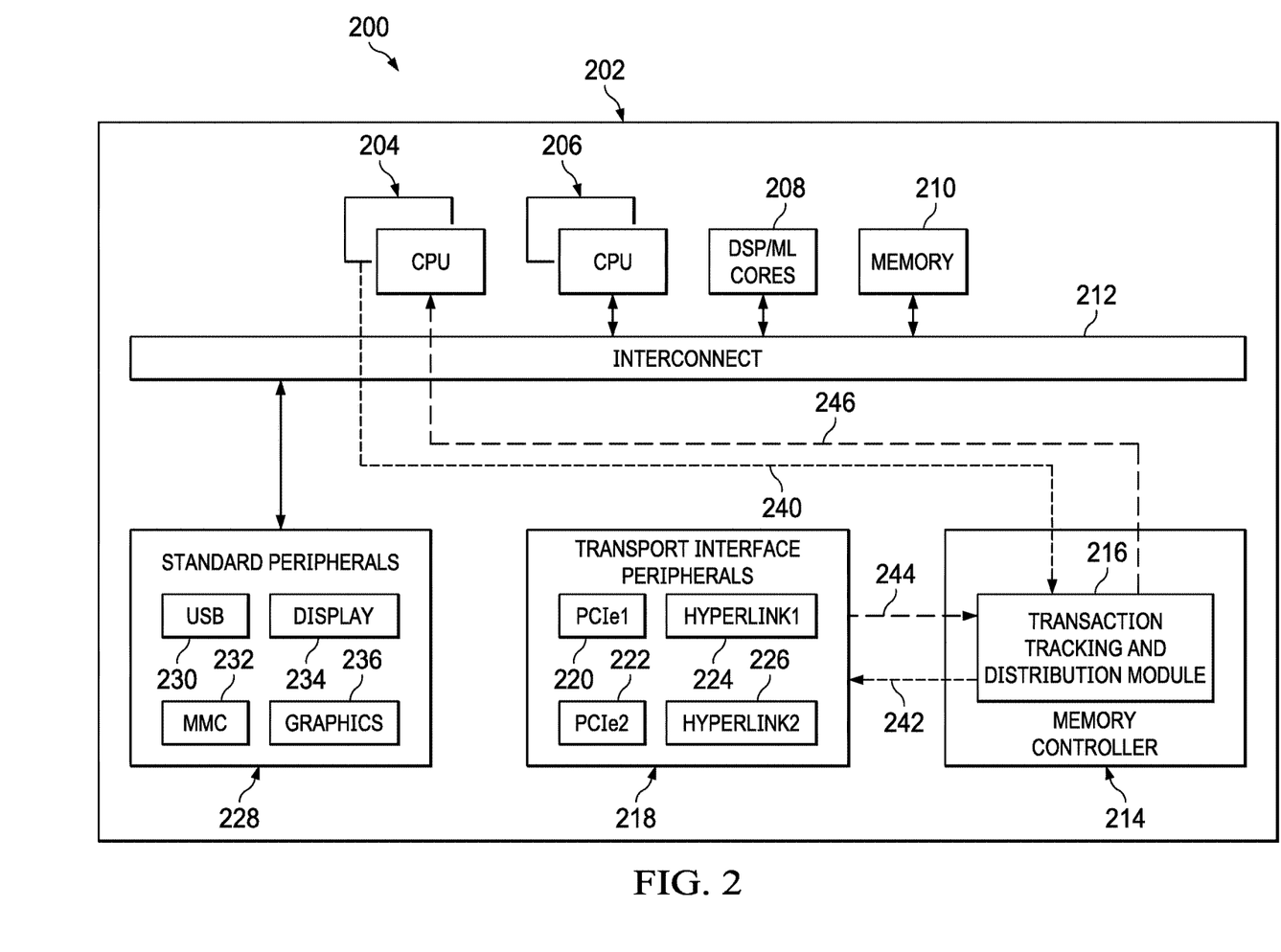
FIG. 2 is a block diagram illustrating data flows, in accordance with aspects of the present disclosure.

FIG. 2 is a block diagram 200 illustrating data flows, in accordance with aspects of the present disclosure. In this example, a SoC 202 may include a first set of CPU cores 204. In some cases, the SoC 202 may also include a second set of CPU cores 206. This second set of CPU cores 206 may be used to supplement the first set of CPU cores 204, for example, by offering lower performance but consuming less power than the first set of CPU cores 204, or by being optimized for certain types of workloads, such as real-time or safety applications. The SoC 202 may also include one or more DSP and/or ML cores 208 and a memory 210. The SoC 202 includes an interconnect 212, which couples the components of the SoC 202 together and provides communications as between the components. The SoC 202 also includes a memory controller module 214 which includes a TTDM 216. The SoC 202 also includes a set of transport interface peripherals 218. The transport interface peripherals 218 may include one or more components which allow data to be transmitted or received and may be accessed using a mapped memory region. In this example, the transport interface peripherals 218 include a first PCI express (PCIe) interface 220, a second PCIe interface 222, a first HyperLink interface 224, and a second HyperLink interface 226. It may be understood that the components included in the transport interface peripherals 218 here are examples and other components accessible via the transport technologies may also be included in the transport interface peripherals 218.

The TTDM 216 may act as a proxy for communications between components. For example, where a component such as a CPU core of the first set of CPU cores 204 wants to transmit data to another component, such as a sensor coupled via the PCIe interfaces 220 and 222 and/or HyperLink interfaces 224 and 226, the CPU core may write 240 the data, along with address information and/or an indication of how to transmit the data, to a memory region mapped to the TTDM 216. The TTDM 216 may, based on the address information and/or indication of how to transmit the data, determine an appropriate transport technology to use. In some cases, policies regarding how to transmit the data may be previously configured. In this example, the TTDM 216 may determine that the data is intended for a component coupled to via the PCIe interfaces 220 and 222 and the HyperLink interfaces 224 and 226, for example based on the address information. The TTDM 216 may determine which interface to use based on, for example, the indication of how to transmit the data PCIe interfaces 220 and 222 and/or HyperLink interfaces 224 and 226 a configuration of the TTDM 216. The TTDM 216 then convert the data into a format compatible with the determined interface. For example, if the TTDM 216 determined to transmit the data via the second PCIe interface 222, the TTDM 216 may convert the data into a format compatible with PCIe. Similarly, if the TTDM 216 determined to transmit the data via both a PCIe interface and a HyperLink interface, the TTDM 216 would convert the data to a format compatible with PCIe and convert a copy of the data to a format compatible with HyperLink. The TTDM 216 then transmits 242 the data via the determined interface. A response 244 may be received via one or more interfaces, such as PCIe interfaces 220 and 222 and/or HyperLink interfaces 224, by the TTDM 216. The TTDM 216 may then forward 246 the response to the CPU core.

The SoC 202 in this example also includes a set of standard peripherals 228 which provide connectivity, services, and/or interfaces that are often available for an SoC 202. In this example, the set of standard peripherals 228 include a universal serial bus (USB) 230 multimedia card (MMC) 232, display 234 connectivity, as well as graphical operations 236, for example, via a GPU or other image processing hardware. In some cases, the set of standard peripherals 228 may include components which may be coupled to and accessible by the transport interface. Such components of the standard peripherals 228 may initiate and participate in transactions with other components, such as a processor core via the TTDM 216.

Figure 3A:
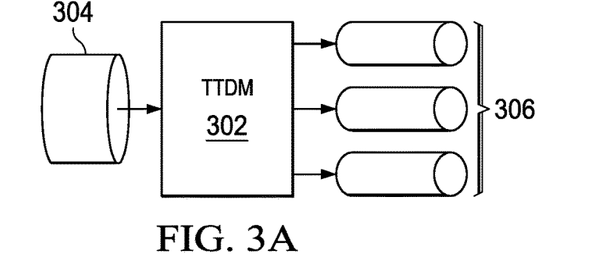
FIGS. 3A-3D are block diagrams illustrating example operating modes for the transaction tracking and distribution module (TTDM), in accordance with aspects of the present disclosures.

FIGS. 3A-3D are block diagrams illustrating example operating modes for the TTDM, in accordance with aspects of the present disclosures. In some cases, the TTDM may support multiple operating modes for transmitting and receiving data. In some cases, the TTDM may be preconfigured to operate in certain operating modes, or the operating mode on the TTDM may be configurable. For example, the TTDM switch among the supported multiple operating modes based on which sub-region of a memory mapped region of the TTDM a memory operation is received in. In FIG. 3A, a TTDM 302 may be configured to operate in a load balancing mode. In this load balancing mode, the TTDM 302 may receive input data from a component 304. The TTDM 302 may then determine which transport technology 306 to use. This determination may be based on, for example, an amount of load on the transport technologies 306. For example, the TTDM 302 may track an amount of data received on the various transport technologies 306 and then determine to use a transport technology associated with a lower amount of data being transported. In some cases, the amount of load on the transport technology may be inferred rather than directly measured. For example, the TTDM 302 may determine which transport technology of the transport technologies 306 to use based on a pattern or rotation. The TTDM 302 may transmit a first set of data on a first transport technology, a second set of data on a second transport technology, and so on. In some cases, the TTDM 302 may split data received from the component 304 into multiple sets of data and transmit the sets of data over different transport technologies. 302. The TTDM 302 may include an indication for how to combine the data with the transmitted sets of data. A second TTDM (not shown) may receive and combine the split sets of data based on the indication for how to combine the data before forwarding the data to a target component (e.g., remote component).

Figure 3B:
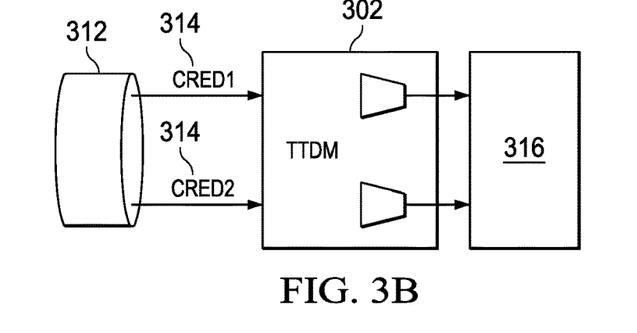

In FIG. 3B, the TTDM 302 may be configured to operate in a regulated bandwidth mode. In this regulated bandwidth mode, the TTDM 302 may receive data from a peripheral 312. The data may include a credential indication 314. The TTDM 302 may prioritize and/or determine which transport technology to transmit the data to a target component 316 based on the credential indication 314. As an example, the data may include a credential indication 314 indicating a priority associated with the data. Data associated with a higher priority credential may then be transmitted by the TTDM 302 via the transport technology before data associated with a lower priority credential. As another example, when there are multiple transport technologies, the TTDM 302 may transmit data associated with a higher priority credential via a different transport technology as compared to data associated with a lower priority credential, thus helping provide differential handling for quality of service. In yet another example with multiple transport technologies, the TTDM 302 may transmit data associated with a higher security credential via a different transport technology as compared to data associated with a lower security credential.

Figure 3C:
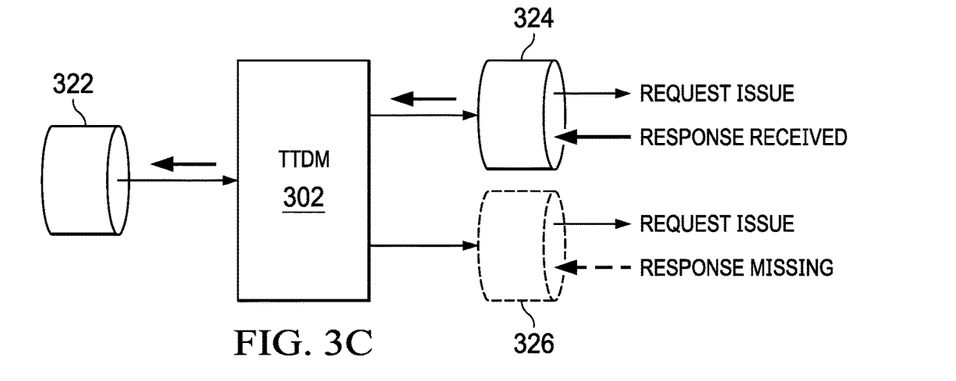

In FIG. 3C, the TTDM 302 may be configured to operate in an any received response mode. In this any received response mode, the TTDM 302 may receive data from a component 322 for transmission to a target component. The TTDM 302 may then transmit multiple copies of the data via multiple transport technologies, including a first transport technology 324, and a second transport technology 326. In this example, copies of the data are transmitted on the first transport technology 324 and the second transport technology 326. A TTDM of a target component (not shown) may receive one or more copies of the transmitted data and forward the data to the target component. The target component may then transmit a response to the component 322 via the TTDM of the target component. The TTDM of the target component may use one or more of the transport technologies. In some cases, the responses may be transmitted using the same transport technologies used to transmit the data or a same number of transport technologies as used to transmit the data. In other cases, the response may be transmitted using a different set of one or more transport technologies.

In this example, the response should be transmitted via the same transport technologies used to transmit the data, e.g., the first transport technology 324 and the second transport technology 326. As shown in this example, a response is not received via the second transport technology 326 for some reason. A response may not be received, for example, if the second transport technology 326 failed to transmit the data to the TTDM of the target component, or the second transport technology 326 failed to transmit the response to the TTDM 302. In the any received response mode, the TTDM 302 may proceed to transmit the response to the component 322 if any response is received. In some cases, if multiple responses are received, the TTDM 302 may transmit the first received response to the component 322 and discard any later received responses. In some cases, if the TTDM 302 expects a response on the second transport technology 326 and does not receive a response within a time window, the TTDM 302 may transmit an indication that the second transport technology 326 has failed, for example, to raise a warning. It may be understood that the multiple transport technologies 324 in this example may be less than all of the transport technologies coupled to the TTDM 302. It may be understood that the data may refer to a request for data from the target component and/or data for the target component, and the response may refer to the data requested from the target component, an error message, and/or an acknowledgement response.

Figure 3D:
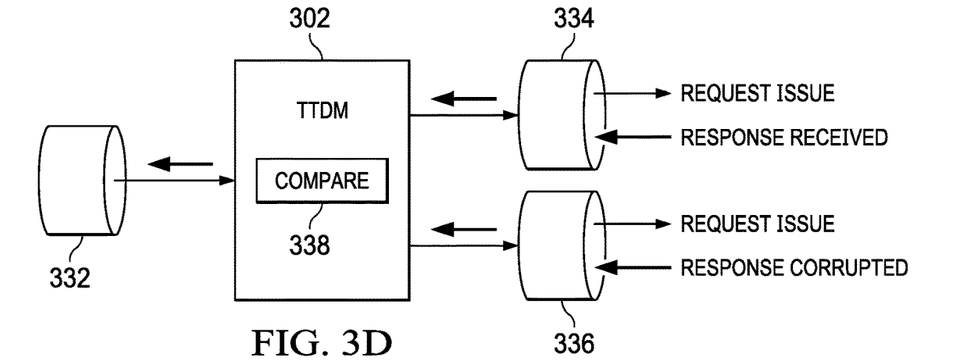

In FIG. 3D, a TTDM 302 may be configured to operate in a best of N-response mode. The initial transmission of data from a component 332 via the TTDM 302 through a first transport technology 334, and a second transport technology 336, as well as response by a target component via associated TTDM of the target component (not shown) may be substantially similar to that discussed above with respect to the any received response mode. In this example, the response may be transmitted via the same transport technologies used to transmit the data, e.g., the first transport technology 334 and the second transport technology 336. As shown in this example, a response is corrupted via the second transport technology 336 for some reason. A response may be corrupted, for example, via electrostatic discharge, radiation induced errors, bit flips, etc.

In the best of N-response mode, the TTDM 302 may include comparator logic 328 which compares the responses received from the transport technologies. The comparator logic 328 may compare the responses received to determine which response is the most commonly received response. For example, if the TTDM 302 receives responses from three transport technologies and two of the responses match, the TTDM 302 may proceed to transmit one of the matching responses to the component 332. In cases where there are an equal number of non-matching responses, the comparator logic 338 may detect an error and may take corrective action. In this example, the comparator logic 338 may compare the response received via the first transport technology 334 to the corrupted response received via the second transport technology 336 and determine that the two responses differ, indicating that there was an error in the transmission. The TTDM 302 may then take corrective action, such as by requesting a retransmission, or transmit an indication that an error was detected. If, for example, instead of a corrupted response from the above example, a response is received via the first transport technology 334 and no response is received via the second transport technology 336, the TTDM 302 may proceed to transmit the response to the component 332 as there was no response to compare the received response against.

Figure 4:
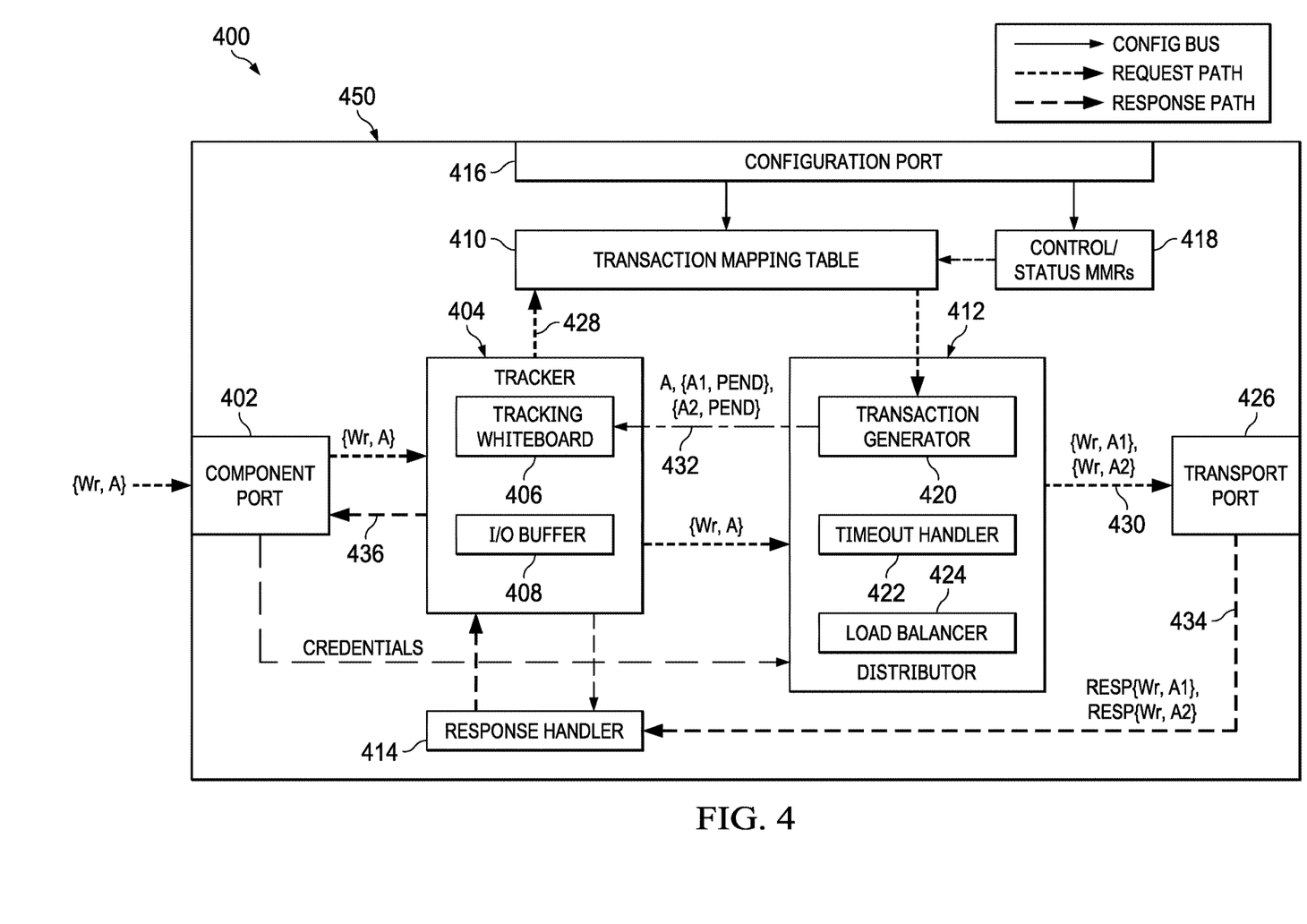
FIG. 4 is a block diagram of a TTDM in a transmit mode of operation, in accordance with aspects of the present disclosure.

FIG. 4 is a block diagram 400 of a TTDM 450 in a transmit mode of operation, in accordance with aspects of the present disclosure. In FIG. 4, portions of the TTDM 450 used during a transmit operation are shown and it may be understood that a TTDM may include portions illustrated in both TTDM 450 of FIG. 4 and TTDM 650 of FIG. 6. As shown, the TTDM 450 includes a component port 402 which may be coupled to a requesting component (e.g., local component). The component port 402 is coupled to a transaction tracker module 404, which includes a tracking whiteboard 406 and an input/output (I/O) buffer 408. The tracking whiteboard 406 may maintain a list of outstanding transactions of the TTDM 450, tallying transactions transmitted to the target component against responses from the target component. The I/O buffer 408 may store data being read from/written to the target component.

The component port 402 may also be coupled to other components, such as a distributor module 412, to help pass input information, such as credential information, to the other components. The transaction tracker module 404 is coupled to a transaction mapping table 410, a distributor module 412, and a response handler module 414. The transaction mapping table 410 is coupled to and receives configuration input from a configuration port 416. The transaction mapping table 410 helps track transactions and may include a mapping as between the mapped memory address from the component port 402 to the target component address space. The configuration port 416 is also coupled to a set of control and status memory mapped registers 418 configured to store control and status information for the TTDM 450. The transaction mapping table 410 may be coupled to and access the set of control and status memory mapped registers 418 to help manage the operating modes.

The distributor module 412 may include a transaction generator module 420, a timeout handler module 422, and a load balancer module 424. The distributor module 412 may act as a configurable policy engine for managing the operating modes of the TTDM 450. The timeout handler module 422 may implement a timeout state machine for tracking whether outstanding transactions have timed out. The load balancer module 424 may help balance transactions across multiple transport technologies and may be configured to help manage credit based load balancing, rate limiting based on the transport technology or rate limited based on a type of data as determined by credentials associated with the data. The distributor module 412 and the response handler module 414 may be coupled to a transport port 426. The transport port 426 may be coupled to one or more transport technologies (not shown).

The TTDM 450 may be configured via the configuration port 416. The configuration port 416 may be mapped to a configuration memory region such that writes to the configuration memory region are input to the configuration port 416. In some cases, the configuration memory region has a memory address separate from the mapped memory region of the TTDM 450, which may be used for input/output operations.

In some cases, the mapped memory region of the TTDM 450 may include two or more sub-regions that may correspond to various functions. For example, sub-regions may correspond with the different operating modes of the TTDM 450. For example, writing data to one sub-region may correspond to an indication to transmit the written data via the load balancing mode, while writing data to another sub-region may correspond to an indication to transmit the written data via a best of N response mode. The transaction mapping table 410 may help track the mapping of the input from these sub-regions and the request sent to the target component.

As an example, a write request {WR, A} to write data to a particular location A on a target component may be received on the component port 402 at in certain memory sub-range of the mapped memory range of the TTDM 450. This write request may be recorded into the tracking whiteboard 406 of the transaction tracker module 404 and the write request may be transmitted to the distributor module 412. The transaction tracker module 404 may also transmit 428 the memory sub-range in which the write request is received to the transaction mapping table 410. The transaction mapping table 410 may then determine an operating mode corresponding to the memory sub-range in which the write request was received. The transaction mapping table 410 may transmit an indication of the operating mode to the transaction generator 420. Based on the indicated operating mode, the transaction generator may address and translate the write request into a format compatible with one or more transport technologies and send the translated write request to the transport port 426 for output to the one or more transport technologies. As an example, if the operating mode indicates that copies of the write request should be transmitted over two transport technologies, the transaction generator 420 may generate two copies of the write request and transmit 430 these two copies of the write request to the transport port 426 for output to the addressed transport technologies. A first copy {Wr,A1} of the write request may be addressed A1 to a first transport technology of the two transport technologies. A second copy {Wr,A2} of the write request may be addressed A2 to a second transport technology of the two transport technologies. The tracking whiteboard may be updated 432 to indicate that the write request for address A was sent on address A1 of the first transport technology and sent on address A2 of the second transport technology and the requests are both pending (e.g., [A, {A1, pend}, {A2, pend}]).

Continuing the example, the target component may perform the write request and transmit responses back via the first transport technology {RespWR,A1} and the second transport technology {RespWR,A2}. These responses may be received at the transport port 426 and transmitted 434 to the response handler 414. The response handler 414 may tally the responses based on the operating mode of the TTDM 450. In this example, the TTDM 450 may be in the any one response operating mode and when a response is received via either the first transport technology or the second technology, the response handler 414 may store the response in the I/O buffer 408. The tracking whiteboard 406 may be updated to indicate that a response has been received for the write request. For example, if a response has been received via the first transport technology, but has not yet been received via the second transport technology, the tracking whiteboard 406 may be updated as [A, {A1, received}, {A2, pend}]. In some cases, the tracking whiteboard 406 may record information regarding the operating mode associated with a transaction. This information may used to determine when a response to the requesting component is appropriate (e.g., when a single response is received, when a best of N responses is determined, etc.) and the response transmitted 436 for output by the component port 402.

Figure 5:
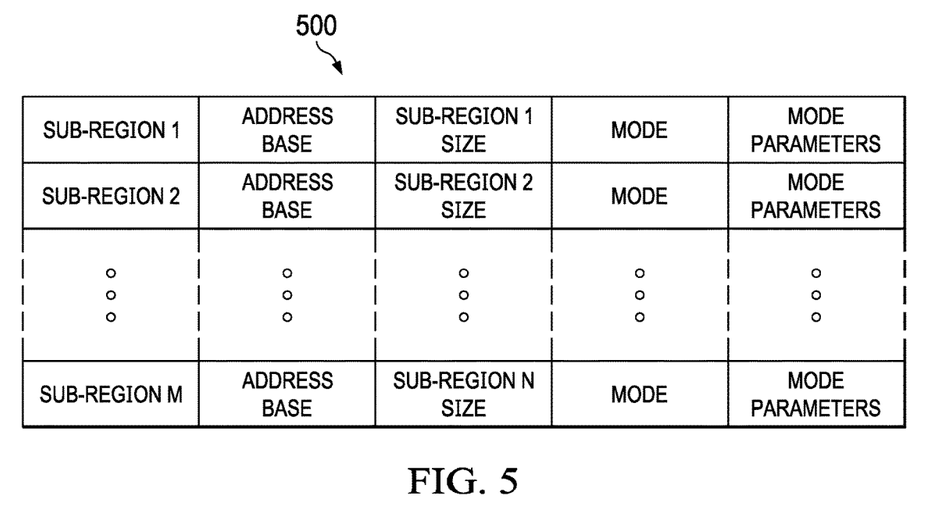
FIG. 5 is a table illustrating a transaction mapping table, in accordance with aspects of the present disclosure.

FIG. 5 is table 500 illustrating a transaction mapping table, in accordance with aspects of the present disclosure. The transaction mapping table may be included in a transaction tracker module and the transaction mapping table maps certain sub-regions of the memory mapped region to certain operating modes of the TTDM. As shown, the transaction mapping table may include information defining multiple regions 1, 2, ... N corresponding to the operating modes supported by the TTDM. Each sub-region may be associated with a base memory address, a size of the sub-region, an operating mode corresponding with the region, and any parameters associated with the operating mode. In some cases, the operating modes supported by the TTDM may be predefined, while aspects of the operating modes, such as the location, size, and operating mode associated with certain sub-regions may be configured, for example, via configuration information received via the configuration port.

Figure 6:
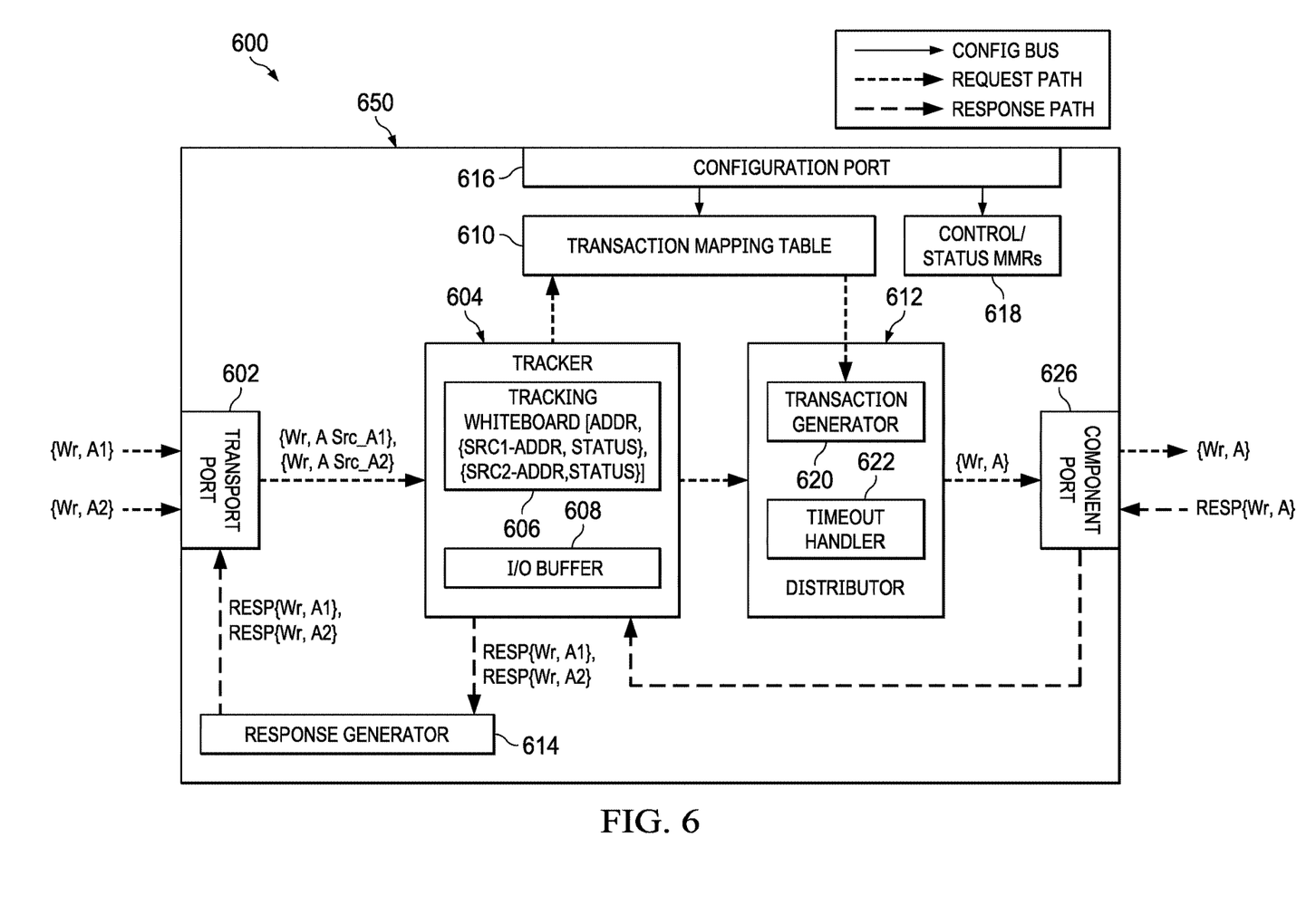
FIG. 6 is a block diagram of a TTDM in a receive mode of operation, in accordance with aspects of the present disclosure.

FIG. 6 is a block diagram 600 of a TTDM 650 in a receive mode of operation, in accordance with aspects of the present disclosure. In FIG. 6, portions of the TTDM 650 used during a receive operation are shown and it may be understood that a TTDM may include portions illustrated in both TTDM 450 of FIG. 4 and TTDM 650 of FIG. 6. As shown, the TTDM 650 includes a transport port 602 which may be coupled to one or more transport technologies (not shown) to a requesting component (e.g., remote component). As with TTDM 450, for TTDM 650, transport port 602 is coupled to a transaction tracker module 604, which includes a tracking whiteboard 606 and an input/output (I/O) buffer 608. The tracking whiteboard 606 may maintain a list of outstanding transactions of the TTDM 650, tallying transactions transmitted to the target component against responses from the target component. The I/O buffer 608 may store data being read from/written to the target component.

The transaction tracker module 604 is coupled to a transaction mapping table 610, a distributor module 612, and a response generator module 614. The transaction mapping table 610 is coupled to and receives configuration input from a configuration port 616. The transaction mapping table 610 helps track transactions and may include a mapping as between the input received from a source component from the transport port 602 to the component address space. The configuration port 616 is also coupled to a set of control and status memory mapped registers 618 configured to store control and status information for the TTDM 650. The transaction mapping table 610 may be coupled to and access the set of control and status memory mapped registers 618 to help manage the operating modes. The distributor module 612 may include a transaction generator module 620 and a timeout handler module 622. The distributor module 612 may act as a proxy to generate local transactions to the mapped target memory region of the target component. The timeout handler module 622 may implement a timeout state machine for tracking whether outstanding transactions have timed out. The distributor module 612 may be coupled to a component port 626 and the component port 626 may be coupled to the target component (e.g., local component). The component port 626 may be coupled to the transaction tracker module 604, and the transaction tracker module 604 may be coupled to the response generator 614. The response generator 614 may be coupled to the transport port 602. The response generator 614 may include a state machine implementation for generating responses to the source component and may implement the configurable operating modes on the target TTDM 650 side.

Tracing the operation of the target TTDM 650 for when a write request is received, a number N of write requests may be received at the transport port 602 from the source TTDM, such as TTDM QE02. Continuing the previous example discussed in conjunction with TTDM QE02 and FIG. QE, two copies of the write request, {Wr,A1} and {Wr,A2} may be received via the first transport technology and the second transport technology respectively at the transport port 602. The write requests may be passed to the transaction tracker module 604 with an indication of a source transport technology the write request was received on (e.g., {Wr,A, Src_A1}, {Wr,A,Src_A2}). The tracking whiteboard 606 may be updated to record that a write request for address A was received on address A1 of the first transport technology and also received on address A2 of the second transport technology, and a status of the write request (e.g., [A, {SRC_A1, received}, {SRC_A2, received}]). The address A of the received write request may be sent to the transaction mapping table 610 where the address of the write request may be translated to a corresponding address of the target component. This translated address may be input to the transaction generator module 620 to generate an appropriate write request (e.g., Wr, A}) for output on the component port 626 to the target component. In cases where multiple write requests are received to the same address, the transaction generator module 620 may merge the multiple write requests to a single write request for the target component. For example, the transaction generator module 620 may track outstanding requests sent to the target component.

The target component, in response to the write request, may output a single response (e.g., Resp{Wr,A}) that is input to the TTDM 650 at the component port 626. The response may be input from the component port 626 to the transaction tracker module 604. The tracking whiteboard may be updated to indicate that a response from the target component has been received (e.g., [A, {SRC_A1, resp.}, {SRC_A2, received}]). In some cases, if the transaction tracker module 604 receives another copy of the write request associated with a write request that has already been completed, such as from another transport technology, the transaction tracker module 604 may drop the copy of the write request. The transaction tracker module 604 may output to the response generator 614, the response to the write request and an indication of the transport technolog (ies) to use to send the response to the write request (e.g., Resp{Wr,A1}, Resp{Wr,A2}). In some cases, output for the response generator 614 may be buffered in the I/O buffer 608. For example, if the response generator 614 has queued responses to send or is busy, response to the write request may be temporarily buffered. In some cases, the indication may be based on the transport technologies from which the write request was received on. The response generator 614 may then generate copies of the write requests for the corresponding transport technolog(ies) and output the write requests to the transport port 602 to the appropriate transport technolog(ies).

Figure 7:
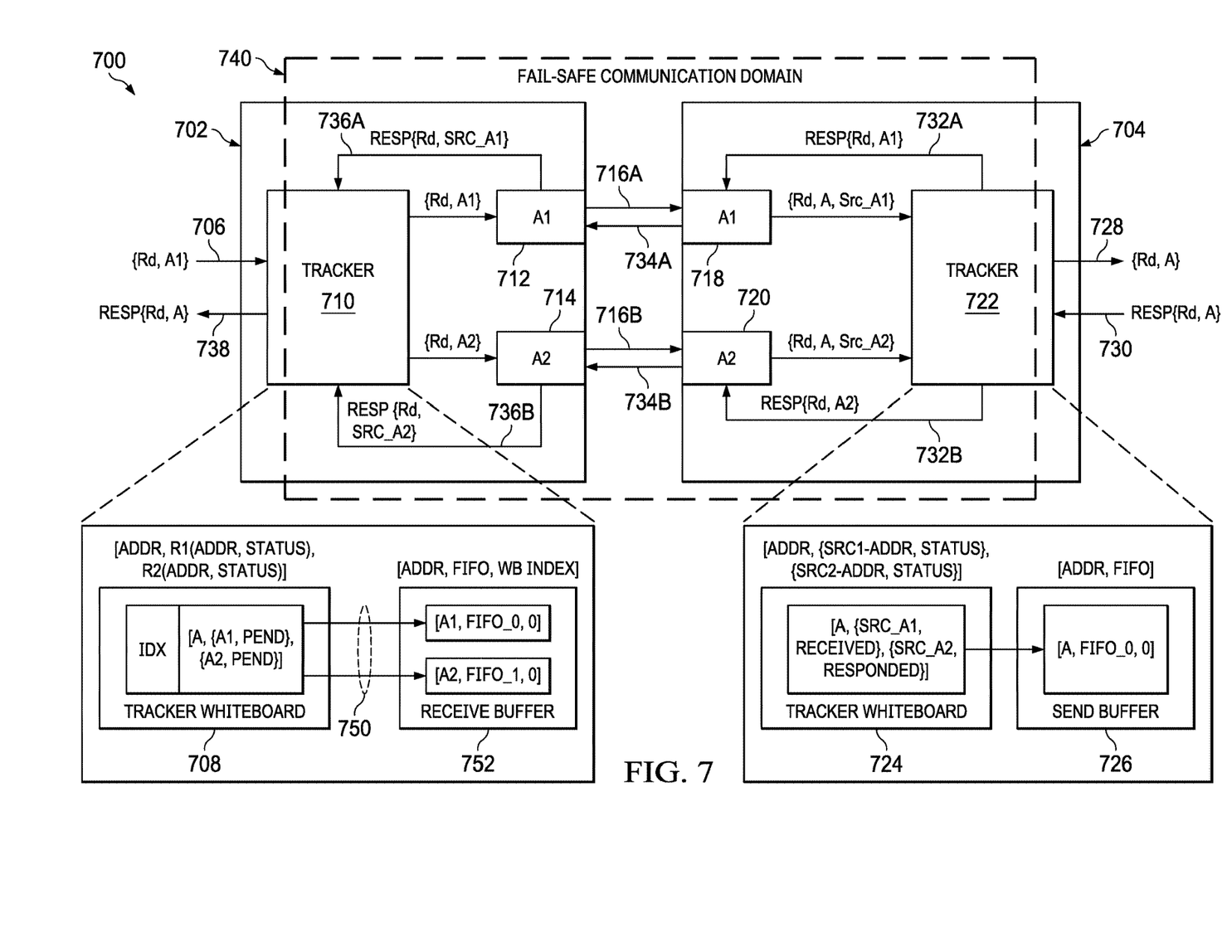
FIG. 7 is a block diagram illustrating data flow between TTDMs, in accordance with aspects of the present disclosure.

FIG. 7 is a block diagram 700 illustrating data flow between TTDMs, in accordance with aspects of the present disclosure. Diagram 700 illustrates data flows for a memory read request from a requesting TTDM 702 to a target TTDM 704. The requesting TTDM 702 may receive a read request 706 (e.g., {Rd,A}) from a requesting component (not shown) for address A for a target component. After receiving the read request 706, a tracking whiteboard 708 of a transaction tracker module 710 may be updated. The tracking whiteboard 708 may record information including the read address of the read request (e.g., Addr), as well as address information (e.g., addr) and request status (e.g., status) for copies of the read request (R1, R2) that may be sent over different transport technologies. In this example, two copies of the read request to address A may be translated to address A1 corresponding to an address space for the first transport technology and address A2 corresponding to an address space for the second transport technology. The tracking whiteboard 708 may record that the read request is associated with a copy of the read request addressed to A1 and copy of the read request addressed to A2 both of which are pending (e.g., [A, {A1, pend}, {A2, pend}]). A writeback index of the tracking whiteboard 708 may be used to identify where in the tracking whiteboard 708 the entry corresponding to the read request is located. The transaction tracker module 710 may also allocate 750 space in an receive buffer 752 (e.g., I/O buffer) to store responses to the copies of the read requests. The receive buffer 752 may also include the addresses that the read requests were sent on, a pointer to the first in first out buffer space (FIFO) for the response, and a write back pointer to the tracker whiteboard 708 index. The two copies of the read request (e.g., {Rd, A1} and {Rd, A2}) may be placed on the output port at mapped memory addresses corresponding to the first transport technology 712 (e.g., A1), and the second transport technology 714 (e.g., A2) and transmitted 716A and 716B on the corresponding transport technologies to the target TTDM 704.

At the target TTDM 704, the copies of the read request may be received at an input port at addresses mapped to the transport technologies. In this example, a first copy of the read request may be received at address A1 mapped to the first transport technology 718 and a second copy of the read request may be received at address A2 corresponding to the second transport technology 720. The received read requests may be input to a transaction tracker module 722 of the target TTDM 704 along with a source indication that indicates the transport technology that the read request was received on (e.g., Src_A1 and Src_A2). A tracking whiteboard 724 of the target TTDM 704 may be updated with information about the received read requests. The tracking whiteboard 724 may record the address of the read request (e.g., Addr), as well as address information for received copies of the read request (e.g., SRC1-addr, SRC2-addr) and corresponding request statuses. In this example, the tracking whiteboard 724 has an entry [A, {SRC_A1, recvd}, {SRC_A2, responded}] which indicates that there is an read request to address A where a first copy of the request was received at address A1 corresponding to the first transport technology, and a second copy of the request was received at address A2 corresponding to the second transport technology and that a response, from the component has been received. For example, transport technologies may not be synchronous and some requests may arrive before other requests. In some cases, messages on certain transport technologies may be relayed via other components (not shown). Where the tracking whiteboard 724 indicates that no response has been received for the copies of the read requests, a single read request 728 (e.g., {Rd,A}) for address A may be sent to the target component.

The transaction tracker module 722 may also allocate space in a send buffer 726 to receive responses to the read request from the component. The send buffer 726 may include an address A of the read request, a pointer to the FIFO space for storing the response data, and a pointer to the tracker whiteboard 724 index. The send buffer 726 may have a single space allocated as a single response is expected from the target component.

The target component may then send a response 730 (e.g., Resp{Rd,A}) to the target TTDM 704 which is passed to the transaction tracker module 722. The response may be stored in the send buffer 726 and the tracking whiteboard 724 may be updated to indicate that a response has been received. The transaction tracker module 722 may then cause copies of the response to be generated and sent via the transport technologies on which the requests were received on. In this example, as the tracking whiteboard 724 indicates that the source of the read request was address A1, corresponding to the first transport technology, and address A2 corresponding to the second transport technology, two copies of the response (e.g., Resp{Rd,A1} and Resp{Rd,A2}) may be generated and sent 732A and 732B to address A1 corresponding to an address space for the first transport technology and address A2 corresponding to an address space for the second transport technology. These copies may be placed on the output port at the mapped memory addresses corresponding to the 718 (e.g., A1), and the second transport technology 720 (e.g., A2) and transmitted 734A and 734B on the corresponding transport technologies to the requesting TTDM 702.

At the requesting TTDM 702, the copies of the response may be received at an input port at addresses mapped to the transport technologies. In this example, a first copy of the read request may be received at address A1 mapped to the first transport technology 712 and a second copy of the read request may be received at address A2 corresponding to the second transport technology 714. The received responses (e.g., Resp{Rd,SRC_A1}, Resp{Rd,SRC_A2}) may be input 736A and 735B to the transaction tracker module 710 of the source TTDM 702 along with a source indication that indicates the transport technology that the response was received on (e.g., Src_A1 and Src_A2). The transaction tracker module 710 may determine that the received response satisfy the operating mode associated with the read request (e.g., any received response mode, best of N-response mode, etc.). The transaction tracker module 710 may then select a copy of the received response (e.g., Resp{Rd, A}) and place the received response on an output port for output 738 to the requesting component.

As shown, a fail-safe domain 740 may be defined by the requesting TTDM 702 and the target TTDM 704 where a single request may be converted into multiple independent requests to provide a level of redundancy against errors in transmitting the request to the target component and transmitting the response back to the source component.

Figure 8:
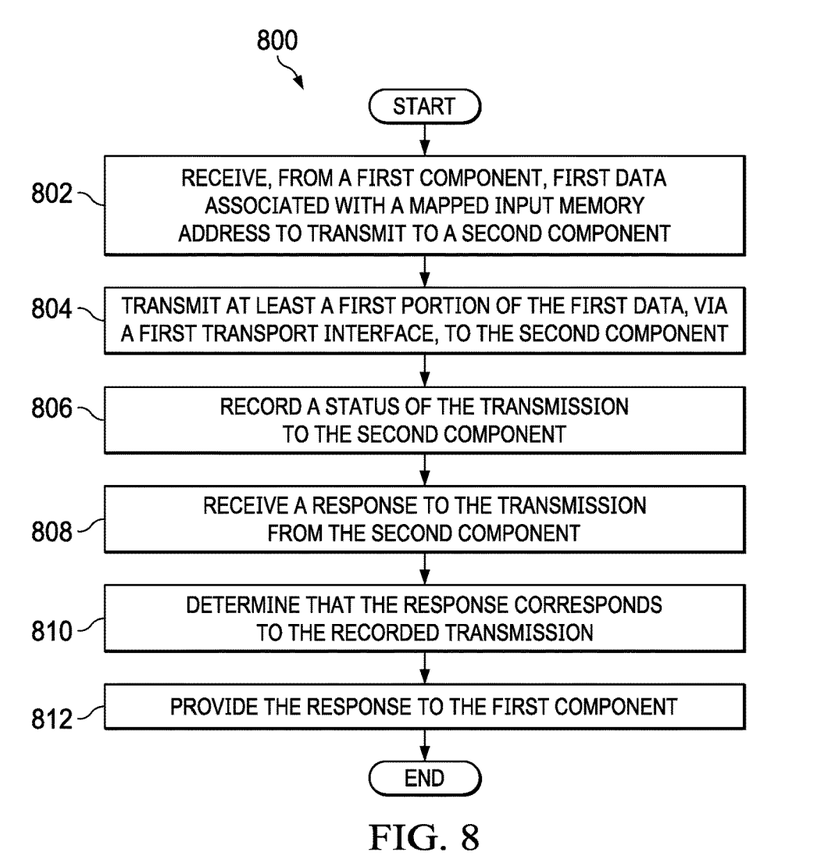
FIG. 8 is a flowchart illustrating a technique for transmitting data, in accordance with aspects of the present disclosure.

FIG. 8 is a flowchart 800 illustrating a technique for transmitting data, in accordance with aspects of the present disclosure. In some cases, this technique may be performed by an electronic device and/or a circuit. In some cases, instructions for performing this technique may be stored on a non-transitory computer readable medium, such as flash storage, magnetic disk, optical media, semiconductor based memory devices, such as electrically programmable read-only memory (EPROM), electrically erasable programmable read-only memory (EEPROM), etc. At block 802, first data associated with a mapped input memory address to transmit to a second component is received from a first component, via a mapped input memory address. For example, a local component may send data for transmission to a remote component (e.g., target component) to a mapped memory location of a TTDM. The TTDM may receive the data via a memory mapped input memory address. In some cases, the TTDM may receive the data and determine an operating mode. In some cases, the operating mode may be determined based on a memory range of the mapped memory input memory address that the data was received on. At block 804, at least a first portion of the first data is transmitted, via a first transport interface, to the second component. In some cases, the TTDM may apply the determined operating mode to transmit the data. For example, the TTDM may be coupled to multiple transport technologies via multiple transport interfaces. The TTDM may determine which of the transport technologies of the multiple transport technologies to use to transmit the data based on the determined operating mode. For example, which transport technology to use may be based on an amount of load on the transport technologies, a credential associated with the data, and/or an indication that multiple transport technologies should be used. At block 806, a status of the transmission to the second component may be recorded. For example, a status of an outstanding transmission to the remote component may be recorded by the TTDM. At block 808, a response to the transmission is received from the second component. For example, the response may be received via one or more of the transport technologies. At block 810, the response is determined to correspond to the recorded transmission. For example, the response may include an indication of a corresponding request and the TTDM may map the response to the corresponding recorded request and update the tracking information. At block 812, the response is provided to the first component. For example, contents of the response may be written to a portion of the mapped memory region to output the contents of the response to the local component.

In some cases, another electronic device and/or a circuit may perform a technique for receiving the transmitted data. In some cases, instructions for performing this technique may be stored on a non-transitory computer readable medium. The technique may include receiving a first message from a remote component via a first transport interface. For example, a TTDM may receive data from a remote component via a transport technology. In some cases, the component may be coupled to a second transport interface and the component may further receive second data from the second transport interface. The received second data may be associated with the first message. For example, the first data and the second data may both include an indicated address for the target component and the first data and second data may be merged to a single request. In some cases, the first message may be compared to the second message to determine that the first message and the second message are different. An indication that an error has been detected may then be output.

The technique may also include outputting the first message to a local component. For example, the TTDM may output the message to the local component. The TTDM may record the message to help determine a status of the message. The outputting may be performed via a memory mapped port. In some cases, the memory mapped port may be presented as a memory mapped region. The technique may also include receiving a response from the local component. For example, local component may receive the message and transmit a response to the message to the TTDM. The technique may also include determining that the received response corresponds to the first message from the remote component. For example, the response may include an indication of the message the response corresponds to and the TTDM may update the record of the message. In some cases, the response may be received via a memory mapped input memory address. In some cases, the TTDM may receive the response and determine an operating mode. In some cases, the operating mode may be determined based on a memory range of the mapped memory input memory address that the response was received on. The technique may also include outputting at least a first portion of the response to the remote component via the first transport interface. For example, the TTDM may output a portion of the response to the transport technology for transmission to the remote TTDM. In some cases, the TTDM may apply the determined operating mode to transmit the response. For example, the TTDM may be coupled to multiple transport technologies via multiple transport interfaces. The TTDM may determine which of the transport technologies of the multiple transport technologies to use to transmit the response based on the determined operating mode.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. An electronic device, comprising:
  a first component configured to transmit a first set of data to a second component by providing a first memory request specifying the first set of data and an input memory address; and
  a transaction tracking unit coupled to a first transport interface, the transaction tracking unit configured to:
    receive the first memory request;
    transmit a second memory request that specifies at least a first portion of the first set of data, via the first transport interface, to the second component;
    receive a response to the second memory request from the second component;
    determine that the response corresponds to the second memory request; and
    provide, to the first component, an output response based on the received response to the second memory request.

2. The electronic device of claim 1, wherein the transaction tracking unit is presented to the first component as a memory mapped region.

3. The electronic device of claim 2, wherein a transport policy of the transaction tracking unit is based on a sub-region of the memory mapped region that the input memory address is located in.

4. The electronic device of claim 1, wherein the transaction tracking unit is coupled to a second transport interface, and wherein the transaction tracking unit is further configured, based on a transport policy, to:
  transmit at least a second portion of the first set of data via the second transport interface to the second component.

5. The electronic device of claim 4, wherein the first transport interface is a different type of transport interface from the second transport interface.

6. The electronic device of claim 4, wherein the second portion is a copy of the first portion.

7. The electronic device of claim 1, wherein the transaction tracking unit is further configured, based on a transport policy, to:
  receive a third memory request specifying a second set of data;
  determine a transmit order for portions of the first set of data and the second set of data based on a first type of data associated with the first set of data and a second type of data associated with the second set of data; and
  transmit the first set of data and the second set of data based on the transmit order.

8. The electronic device of claim 1, wherein the transaction tracking unit is coupled to a second transport interface and wherein the transaction tracking unit is further configured to:
  receive the response via either the first transport interface or the second transport interface.

9. The electronic device of claim 1, wherein the transaction tracking unit is coupled to a second transport interface and wherein the transaction tracking unit is further configured, based on a transport policy, to:
  receive a first version of the response via the first transport interface;
  receive a second version of the response via the second transport interface;
  compare the first version and the second version to determine that the first version and the second version are the same; and
  provide one of the first version or the second version of the response to the first component via the output response.

10. The electronic device of claim 1, wherein the transaction tracking unit is coupled to a second transport interface and wherein the transaction tracking unit is further configured, based on a transport policy, to:
  receive a first version of the response via the first transport interface;
  receive a second version of the response via the second transport interface;
  compare the first version and the second version to determine that the first version and the second version are different; and
  output an indication that an error has been detected.

11. The electronic device of claim 1, wherein the transaction tracking unit is coupled to at least three transport interfaces and wherein the transaction tracking unit is further configured, based on a transport policy, to:
  receive a set of responses via the at least three transport interfaces;
  compare responses of the set of responses to determine an output version of the response, wherein at least two responses of the set of responses are the same; and
  provide the output version of the response as the output response.

12. A circuit comprising:
  a transaction tracking unit configured to:
    receive a first message from a remote component via a first transport interface; and
  a memory mapped port coupled to the transaction tracking unit, the memory mapped port configured to:
    output the first message to a local component; and
    receive a response from the local component;
  wherein the transaction tracking unit is further configured to:
    determine that the received response corresponds to the first message from the remote component; and
    output at least a first portion of the response to the remote component via the first transport interface.

13. The circuit of claim 12, wherein the transaction tracking unit is presented to the local component as a memory mapped region.

14. The circuit of claim 12, wherein the transaction tracking unit is coupled to a second transport interface, and wherein the transaction tracking unit is further configured, based on a transport policy, to:
  output at least a second portion of the response via the second transport interface to the remote component.

15. The circuit of claim 12, wherein the transaction tracking unit is coupled to a second transport interface, and wherein the transaction tracking unit is further configured to:
  receive a second message from the remote component via the second transport interface; and
  map the second message to the first message.

16. The circuit of claim 15, wherein the transaction tracking unit is further configured to:
  compare the first message and the second message to determine that the first message and the second message are different; and
  output an indication that an error has been detected.

17. The circuit of claim 15, wherein the transaction tracking unit is further configured to:
  determine transport technologies over which the first and second messages were received on; and
  output the first portion of the response and a second portion of the response based on the determined transport technologies.

18. A method for transmitting data, the method comprising:
  receiving, from a first component, first data associated with a mapped input memory address to transmit to a second component;
  transmitting at least a first portion of the first data, via a first transport interface, to the second component;
  recording an indication of the transmission to the second component;
  receiving a response to the transmission from the second component;
  determining that the response corresponds to the recorded indication of the transmission; and
  providing the response to the first component.

19. The method of claim 18, further comprising:
  transmitting at least a second portion of the first data via a second transport interface to the second component.

20. The method of claim 19, wherein the first transport interface is a different type of transport interface from the second transport interface.

* * * * *